No. 639,652. Patented Dec. 19, 1899.
O. BEHREND.
SECONDARY BATTERY.
(Application filed Oct. 30, 1899.)
(No Model.)
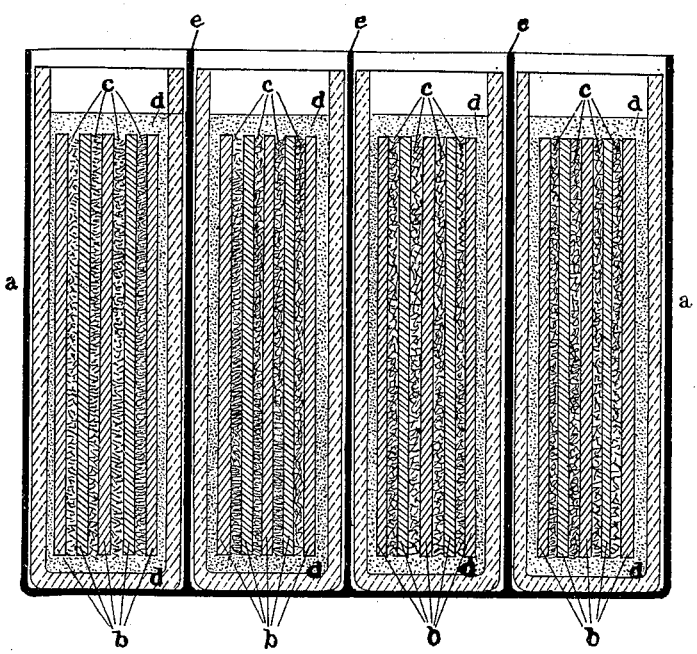
Witnesses
H. M. Gillman Jr.
H. S. Ogden Jr.
Inventor
Oskar Behrend
by Peter Freeman
Attorney
THE NORRIS PETERS CO., PHOTO-LITHO., WASHINGTON, D. C.

UNITED STATES PATENT OFFICE.

OSKAR BEHREND, OF FRANKFORT-ON-THE-MAIN, GERMANY.

SECONDARY BATTERY.

SPECIFICATION forming part of Letters Patent No. 639,652, dated December 19, 1899.

Application filed October 30, 1899. Serial No. 735,247. (No model.)

*To all whom it may concern:*

Be it known that I, OSKAR BEHREND, a subject of the Emperor of Germany, and a resident of Frankfort-on-the-Main, Germany, have invented certain new and useful Improvements in Secondary Batteries, of which the following is a specification.

This invention has for its object to provide an improved electrical accumulator or secondary battery in which the active material is not liable to crumble or fall off from the plates and the plates are not liable to become distorted, while space is economized and weight lessened.

According to this invention the positive and negative electrodes are separated by the material known as "luffah," a plate of which is placed between each two opposed plates until the whole forms one block of a size such as to allow of its being slid into the receptacle. The receptacle is then filled with dilute sulfuric acid or other suitable electrolyte, and under the action of the electrolyte the luffah plates are still further increased by subjecting them to pressure prior to their use. An electric accumulator or secondary battery thus formed is of small weight and has very little internal resistance and requires but a small quantity of electrolyte, and owing to the elements being arranged closely adjacent to each other it is of high capacity in proportion to the size of the receptacle employed. For instance, in cases where under the usual construction five pairs of elements would be used, in the arrangement according to my invention seven pairs of elements can be easily employed. As luffah has great absorbing capacity, it is not necessary to charge the accumulator with (or with any large amount of) unabsorbed electrolyte, so that my electric accumulator or secondary battery is very useful—for instance, for motors or in other cases where there is liability to concussion or vibrations. The sensitiveness to concussion and vibrations may be further reduced by filling any spaces that may exist between the plates or the plates and the receptacle with powdered glass.

In the accompanying drawing the new accumulator is shown in longitudinal section, $a$ being the outer receptacle, $b$ the electrodes, and $d$ the glass filling. $e$ are the stationary walls of the receptacle dividing the latter into cells.

I claim—

1. An electric accumulator the electrodes of which are separated one from another by a plate or sheet of "luffah" as and for the purpose set forth.

2. An electric accumulator the electrodes of which are separated one from another by a plate or sheet of "luffah" which previously has been subjected to pressure as and for the purpose set forth.

3. An electric accumulator the electrodes of which are separated one from another by a plate or sheet of "luffah" the remaining spaces between the plates or the plates and the receptacle being filled with powdered glass, as and for the purpose set forth.

4. An electric accumulator the electrodes of which are separated one from another by a plate or sheet of "luffah" which previously has been subjected to pressure the remaining spaces between the plates or the plates and the receptacle being filled with powdered glass, as and for the purpose set forth.

In testimony whereof I have signed my name to this specification in the presence of two subscribing witnesses.

OSKAR BEHREND.

Witnesses:
FRANZ HASSLACHER,
HERMANN JACK.